United States Patent
Ko et al.

(10) Patent No.: US 6,952,232 B2
(45) Date of Patent: Oct. 4, 2005

(54) DIGITAL CAMERA HAVING A VIEWFINDER WITH ADJUSTABLE LENGTH

(75) Inventors: Yu-chen Ko, Taipei (TW); Weng-tiang Tang, Penang (MY)

(73) Assignee: Inventec Multimedia & Telecom Corp. (TW)

( * ) Notice: Subject to any disclaimer, the term of this patent is extended or adjusted under 35 U.S.C. 154(b) by 692 days.

(21) Appl. No.: 10/133,267

(22) Filed: Apr. 26, 2002

(65) Prior Publication Data

US 2003/0020823 A1 Jan. 30, 2003

(30) Foreign Application Priority Data

Jul. 19, 2001 (TW) ...................................... 90212264 U

(51) Int. Cl.$^7$ ............................................. H04N 5/225
(52) U.S. Cl. ...................................... 348/341; 348/375
(58) Field of Search ................................ 348/341, 373, 348/374, 375, 376, 333.06; 396/349, 348

(56) References Cited

U.S. PATENT DOCUMENTS

| | | | | |
|---|---|---|---|---|
| 5,043,822 A | * | 8/1991 | Ichiyoshi et al. | 348/341 |
| 5,146,252 A | * | 9/1992 | Burnham | 396/348 |
| 5,146,253 A | * | 9/1992 | Swayze | 396/349 |
| 6,252,628 B1 | * | 6/2001 | Kobayashi | 348/341 |

FOREIGN PATENT DOCUMENTS

JP      2001028700 A    *   1/2001  .......... H04N/5/225

* cited by examiner

Primary Examiner—Aung Moe
(74) Attorney, Agent, or Firm—Martine Penilla & Gencarella, LLP

(57) ABSTRACT

The invention provides a digital camera having a viewfinder with an adjustable length. The digital camera includes a first viewfinder member, a second viewfinder member, a first resilient member, a first engagement member, and a second engagement member. In this invention, the first viewfinder member is mounted in the digital camera. The second viewfinder member is mounted in the first viewfinder member and is capable of sliding relative to the first viewfinder member. The first resilient member is connected to the second viewfinder member and capable of pushing the second viewfinder member from a ready position to an ejected position. The first engagement member is mounted on the second viewfinder member. The second engagement member cooperates with the first engagement member so as to press against the first engagement member to keep the second viewfinder member at the ready position when the second engagement member is at an engaged position, and to be pushed toward the ejected position by the first resilient member when the second engagement member moves toward a non-engaged position.

12 Claims, 3 Drawing Sheets

DIGITAL CAMERA HAVING A VIEWFINDER WITH ADJUSTABLE LENGTH

BACKGROUND OF THE INVENTION

1. Field of the Invention

The invention relates to a digital camera having a viewfinder with an adjustable length.

2. Description of the Related Art

In general, the size of an electronic apparatus depends on the number and the sizes of electronic elements of the electronic apparatus. With the advance in semiconductor technology, the sizes of electronic elements are reduced greatly. Therefore, the size of the electronic element is no longer one of the important factors regarding the size of an electronic apparatus. One of the important factors limiting the size of the electronic apparatus resides in the hardware structure of the electronic apparatus.

Taking a digital camera as an example, since the internal electronic elements of the digital camera can be made very small, the volume of the current digital camera is far smaller than that of the early digital camera. However, one of the important factors limiting the size of the digital camera resides in the length of the viewfinder. The viewfinder is provided for users to view the image acquired by the digital camera. According to the principle of optical imaging, the length of the viewfinder must be within a predetermined range. Consequently, the factor of the viewfinder length limiting the size of the digital camera is greater than the factor of the sizes of the electronic elements limiting the size of the digital camera.

As for the factor of the viewfinder length limiting the size of the digital camera, a method of changing the appearance of the digital camera has been disclosed to solve the problem. In other words, the digital camera is designed so that the viewfinder length is greater than the thickness of the camera body. Using such a design, however, the appearance of the digital camera may be influenced. Furthermore, it is inconvenient for users when carrying the digital camera, and the projecting viewfinder may be easily damaged.

In addition, in order to solve the problem of the viewfinder length limiting the size of the digital camera, it is possible to change the viewfinder to a liquid crystal screen. Although the viewfinder length can be decreased using the liquid crystal screen as a viewfinder, the manufacturing cost of the digital camera having the liquid crystal screen is increased because the liquid crystal screen is expensive.

To sum up, it is important to design a viewfinder capable of decreasing the thickness of the digital camera as well as costing less than the digital camera using a liquid crystal screen as a viewfinder.

SUMMARY OF THE INVENTION

In view of the above-mentioned problem, it is therefore an objective of the invention to provide a viewfinder capable of decreasing the thickness of the digital camera.

Another objective of the invention is to provide a viewfinder costing less than a viewfinder using a liquid crystal screen.

To achieve the above-mentioned objectives, the invention provides a digital camera having a viewfinder with an adjustable length. The digital camera includes a first viewfinder member, a second viewfinder member, a first resilient member, a first engagement member, and a second engagement member. In this invention, the first viewfinder member is mounted in the digital camera. The second viewfinder member is mounted in the first viewfinder member and is capable of sliding relative to the first viewfinder member. The first resilient member is connected to the second viewfinder member and capable of pushing the second viewfinder member from a ready position to an ejected position. The first engagement member is mounted on the second viewfinder member. The second engagement member cooperates with the first engagement member so as to press against the first engagement member to keep the second viewfinder member at the ready position when the second engagement member is at an engaged position, and to be pushed toward the ejected position by the first resilient member when the second engagement member moves toward a non-engaged position.

According to one aspect of the invention, the second engagement member may include an actuator. The second engagement member can move from the engaged position to the non-engaged position after the actuator is actuated. In addition, at least one of the first engagement member and the second engagement member includes a slanted surface enabling the second engagement member to move toward the non-engaged position and the second viewfinder member to move toward the ready position when the second viewfinder member is pressed from the ejected position to the ready position.

According to another aspect of the invention, the digital camera may further include a second resilient member and a switching member. In this invention, the second resilient member is connected to the second engagement member, and capable of pushing the second engagement member from the non-engaged position to the engaged position. A switching member switches a state of the digital camera and is arranged so it is triggered when the second engagement member moves toward the non-engaged position.

Using such a design, since the viewfinder consists of the first viewfinder member and the second viewfinder member, and the position of the second viewfinder member relative to the first viewfinder member may be changed, the length of the viewfinder can be shortened when the digital camera is not in use. Accordingly, the digital camera may be made thinner. When the digital camera is not in use, the viewfinder may be received within a thinner digital camera, so that the viewfinder does not project out from the thinner digital camera.

DETAIL DESCRIPTION OF THE INVENTION

The digital camera having a viewfinder with an adjustable length in accordance with the preferred embodiment of the invention will be described with reference to the accompanying drawings, wherein the same reference numbers denote the same elements.

Figure 1:
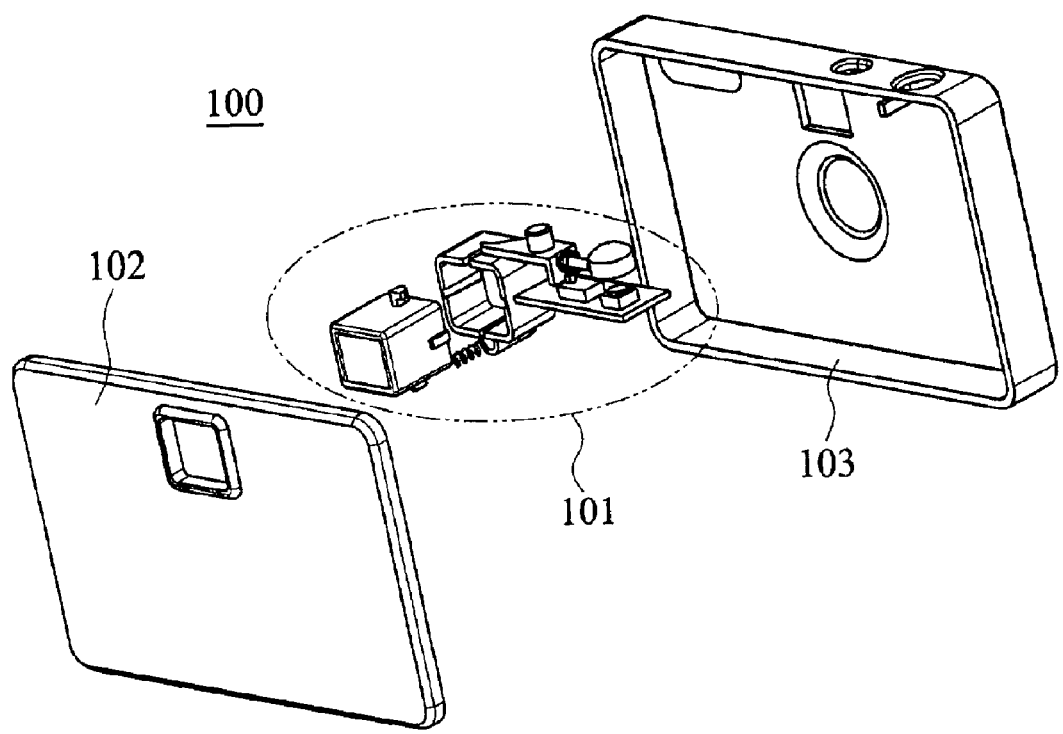
FIG. 1 is a pictorial view showing the structure of a digital camera in accordance with a preferred embodiment of the invention.

Referring to FIG. 1, the digital camera 100 in accordance with a preferred embodiment of the invention includes a viewfinder assembly 101, a first camera body 102 and a second camera body 103. The viewfinder assembly 101 is arranged between the first camera body 102 and the second camera body 103.

Figure 2:
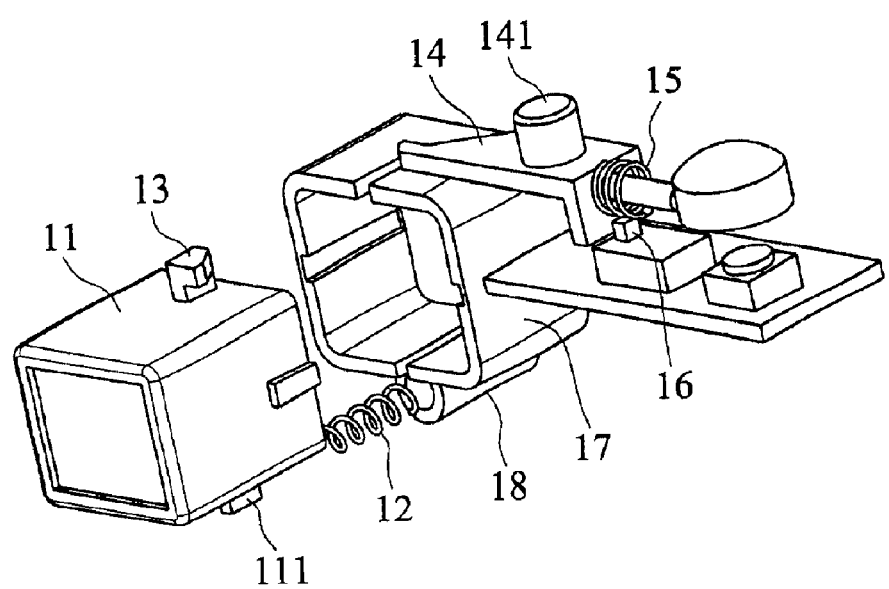
FIG. 2 is a pictorial view showing the structure of a viewfinder assembly of the digital camera in accordance with the preferred embodiment of the invention.

Referring to FIG. 2, the viewfinder assembly 101 of this embodiment includes a second viewfinder member 11, a first resilient member 12, a first engagement member 13, a second engagement member 14, a second resilient member 15 and a switching member 16. The second viewfinder member 11 is mounted within the first viewfinder member 17 and can slide within the first viewfinder member 17. The second viewfinder member 11 also has a tab 111 contacting the first resilient member 12. The first resilient member 12 may be a spring having one end contacting the tab 111 of the second viewfinder member 11, and the other end received in the sleeve 18. The first engagement member 13 is attached to the second viewfinder member 11. The second engagement member 14 contacts the second resilient member 15 and is formed with an actuator 141. The second resilient member 15 also may be a spring having one end contacting the second engagement member 14, and the other end contacting a member (not shown in FIG. 2) mounted in the digital camera 100.

In this embodiment, the first viewfinder member 17 and the sleeve 18 are mounted in the digital camera 100, while the second viewfinder member 11, the first resilient member 12, the first engagement member 13, the second engagement member 14 and the second resilient member 15 in the digital camera 100 are movable members.

Figure 3:
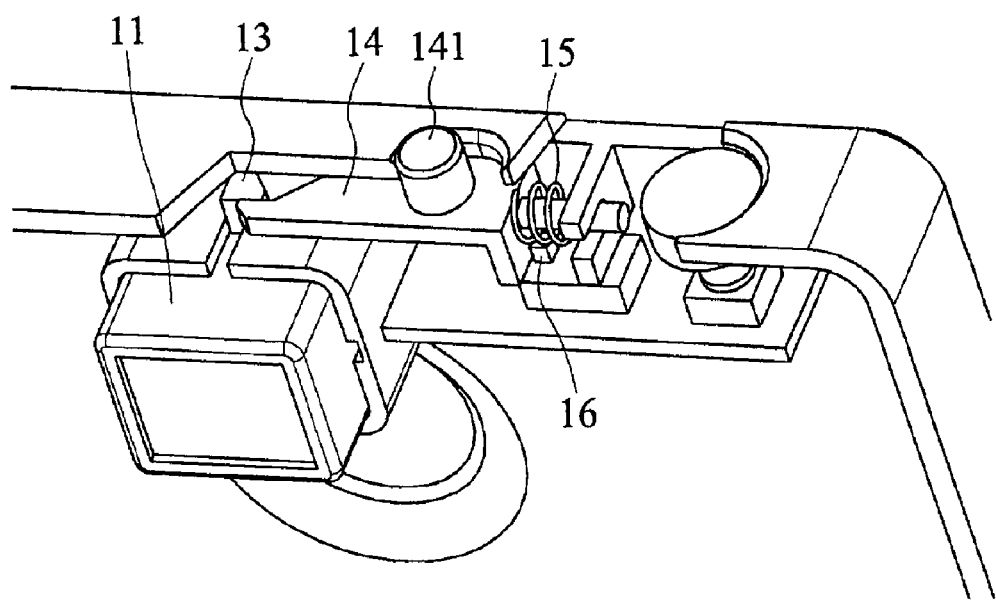
FIG. 3 is a pictorial view showing a second viewfinder member located at a ready position in the digital camera in accordance with the preferred embodiment of the invention.

FIG. 3 shows the state where the second viewfinder member 11 is positioned at a ready position. In FIG. 3, the second engagement member 14 is in an engaged position to press against the first engagement member 13. At this time, the first resilient member 12 is compressed. However, since the second engagement member 14 presses against the first engagement member 13, the second viewfinder member 11 is still kept at the ready position as shown in FIG. 3.

Figure 4:
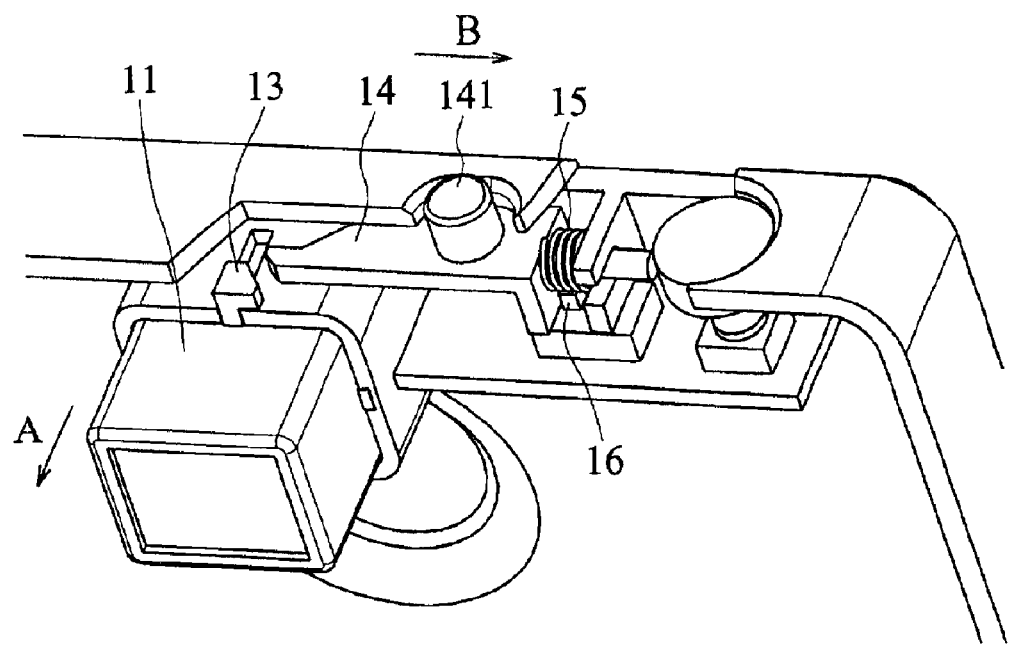
FIG. 4 is a pictorial view showing a second engagement member moving toward a non-engaged position in the digital camera in accordance with the preferred embodiment of the invention.

Referring to FIG. 4, when a user actuates the actuator 141 to cause the second engagement member 14 to move toward a non-engaged position along a direction B, the first resilient member 12 moves along a direction A to push the second viewfinder member 11 because the second engagement member 14 no longer presses against the first engagement member 13. When the second engagement member 14 moves along the direction B, the switching member 16 is triggered to enable the digital camera 100 to be ready for acquiring images.

Figure 5:
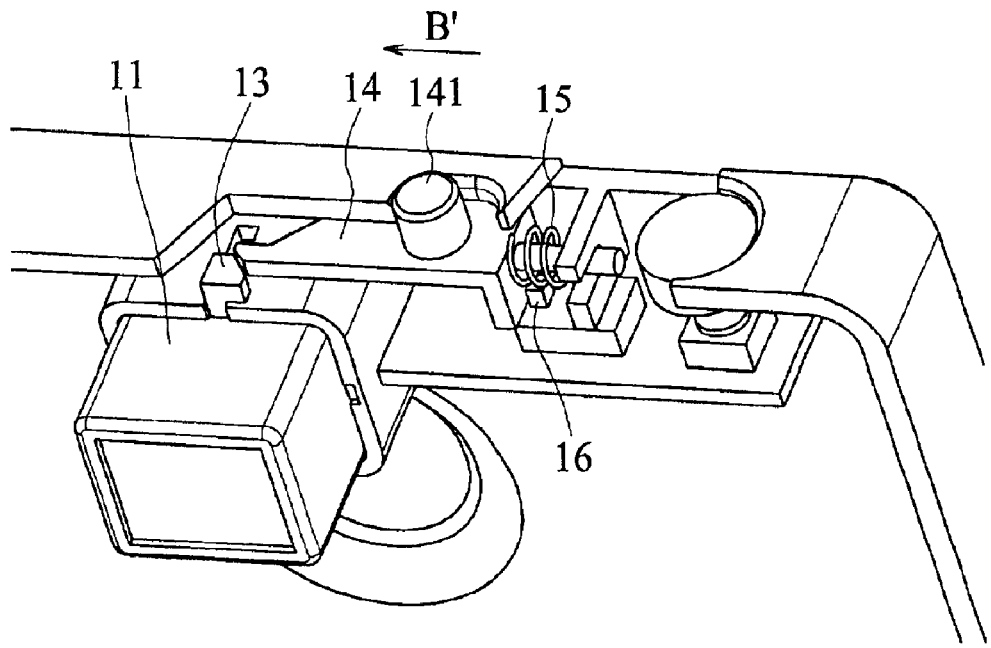
FIG. 5 is a pictorial view showing the second viewfinder member located at an ejected position in the digital camera in accordance with the preferred embodiment of the invention.

The second resilient member 15 is pressed when the second engagement member 14 moves along the direction B. After the user looses the actuator 141 (i.e., the user's finger actuating the actuator 141 moves away from the actuator 141), the second engagement member 14 will be pushed by the second resilient member 15 along a direction B' until contacting the first engagement member 13, as shown in FIG. 5. At this time, the second viewfinder member 11 is located at an ejected position where the user may preview the to-be-acquired image, through the second viewfinder member, after the shutter is activated.

Figure 6:
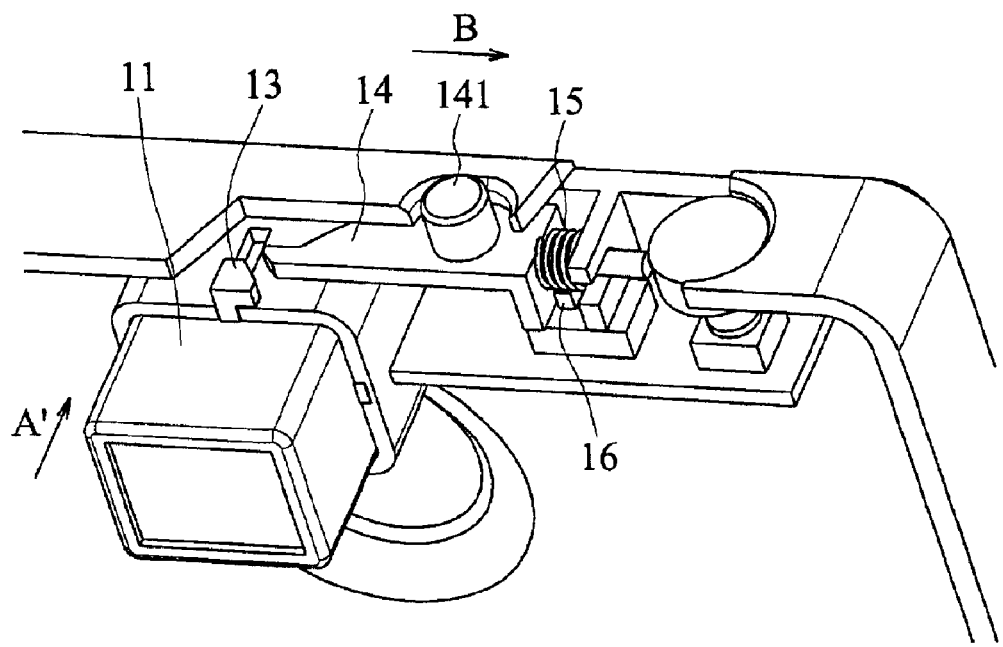
FIG. 6 is a pictorial view showing the second viewfinder member pressed back to the ready position in the digital camera in accordance with the preferred embodiment of the invention.

Referring to FIG. 6, at least one of the first engagement member 13 and the second engagement member 14 in this embodiment includes a slanted surface. The slanted surface causes the second engagement member 14 to move toward the non-engaged position when the second viewfinder member 11 is pressed from the ejected position to the ready position along a direction A'. Accordingly, the second viewfinder member 11 can move to the ready position.

After the second viewfinder member 11 moves to the ready position, the second resilient member 15 pushes the second engagement member 14 from the non-engaged position back to the engaged position so as to press against the first engagement member 13 and fix the second viewfinder member 11 at the ready position as shown in FIG. 3.

When the second viewfinder member 11 are pressed from the ejected position to the ready position along the direction A', the second engagement member 14 moves toward the non-engaged position. Therefore, the switching member 16 is again triggered so that the state of the digital camera is changed.

In this embodiment, the first viewfinder member 17 and the second viewfinder member 11 form a viewfinder with an adjustable length. When the digital camera is not in use, the second viewfinder member 11 may be placed at the ready position to shorten the length of the viewfinder. When the digital camera is used, the user may actuate the actuator 141 to cause the second viewfinder member 11 to eject to the ejected position, thereby increasing the length of the viewfinder.

Using such a design, since the length of the viewfinder in the digital camera can be shortened when the digital camera is not in use, the digital camera may be made thinner. When the digital camera is not in use, the viewfinder may be received within a thinner digital camera, so that the viewfinder does not project out from the thinner digital camera.

While the invention has been described by way of an example and in terms of a preferred embodiment, it is to be understood that the invention is not limited to the disclosed embodiment. To the contrary, it is intended to cover various modifications. Therefore, the scope of the appended claims should be accorded the broadest interpretation so as to encompass all such modifications.

What is claimed is:

1. A digital camera having a viewfinder with an adjustable length, comprising:
   a first viewfinder member mounted in the digital camera;
   a second viewfinder member capable of sliding relative to the first viewfinder member;
   a first resilient member connected to the second viewfinder member and capable of pushing the second viewfinder member from a ready position to an ejected position;
   a first engagement member mounted on the second viewfinder member; and
   a second engagement member cooperating with the first engagement member so as to press against the first engagement member to keep the second viewfinder member at the ready position when the second engagement member is at an engaged position, and to be pushed toward the ejected position by the first resilient member when the second engagement member moves toward a non-engaged position.

2. The digital camera according to claim 1, wherein the second engagement member includes an actuator, and the second engagement member can move from the engaged position to the non-engaged position after the actuator is actuated.

3. The digital camera according to claim 1, further comprising:
a second resilient member connected to the second engagement member and capable of pushing the second engagement member from the non-engaged position to the engaged position.

4. The digital camera according to claim 1, wherein at least one of the first engagement member and the second engagement member includes a slanted surface enabling the second engagement member to move toward the non-engaged position and the second viewfinder member to move toward the ready position when the second viewfinder member is pressed from the ejected position to the ready position.

5. The digital camera according to claim 1, further comprising:
a switching member for switching a state of the digital camera, which is arranged so as to be triggered when the second engagement member moves toward the non-engaged position.

6. The digital camera according to claim 1, wherein the second viewfinder member is arranged inside the first viewfinder member.

7. A viewfinder assembly used in a digital camera, the viewfinder assembly comprising:
a first viewfinder member mounted in the digital camera;
a second viewfinder member capable of sliding relative to the first viewfinder member;
a first resilient member connected to the second viewfinder member and capable of pushing the second viewfinder member from a ready position to an ejected position;
a first engagement member mounted on the second viewfinder member; and
a second engagement member cooperating with the first engagement member so as to press against the first engagement member to keep the second viewfinder member at the ready position when the second engagement member is at an engaged position, and to be pushed toward the ejected position by the first resilient member when the second engagement member moves toward a non-engaged position.

8. The viewfinder assembly according to claim 7, wherein the second engagement member includes an actuator, and the second engagement member can move from the engaged position to the non-engaged position after the actuator is actuated.

9. The viewfinder assembly according to claim 7, further comprising:
a second resilient member connected to the second engagement member and capable of pushing the second engagement member from the non-engaged position to the engaged position.

10. The viewfinder assembly according to claim 7, wherein at least one of the first engagement member and the second engagement member includes a slanted surface enabling the second engagement member to move toward the non-engaged position and the second viewfinder member to move toward the ready position when the second viewfinder member is pressed from the ejected position to the ready position.

11. The viewfinder assembly according to claim 7, further comprising:
a switching member for switching a state of the digital camera, which is arranged so as to be triggered when the second engagement member moves toward the non-engaged position.

12. The viewfinder assembly according to claim 7, wherein the second viewfinder member is arranged inside the first viewfinder member.

* * * * *